Figure 1:
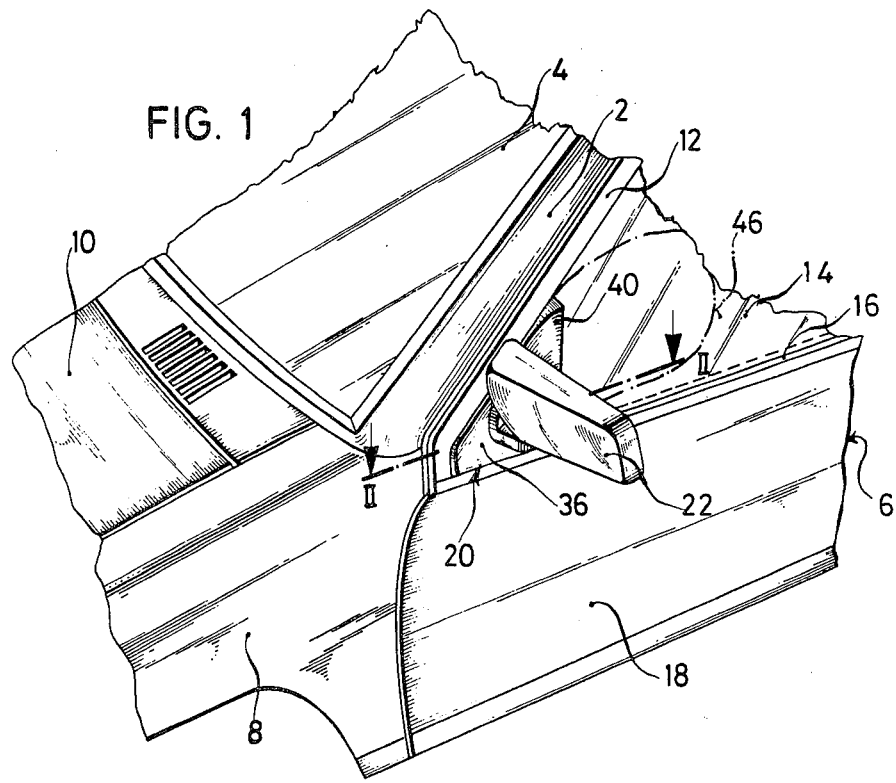

United States Patent [19]

Wepler

[11] 4,200,327
[45] Apr. 29, 1980

[54] AIR-DEFLECTING ARRANGEMENT
[75] Inventor: Manfred Wepler, Bischofsheim, Fed. Rep. of Germany
[73] Assignee: General Motors Corporation, Detroit, Mich.
[21] Appl. No.: 931,091
[22] Filed: Aug. 4, 1978
[51] Int. Cl.² ............................................ B60J 1/20
[52] U.S. Cl. ......................................... 296/15; 296/91
[58] Field of Search ................................ 296/15, 91
[56] References Cited

U.S. PATENT DOCUMENTS

| | | | |
|---|---|---|---|
| 3,072,431 | 1/1963 | Shumaker | 296/15 |
| 3,591,229 | 7/1971 | Wilfert | 296/15 |
| 4,085,665 | 4/1978 | Paxton | 296/91 |

Primary Examiner—Philip Goodman
Attorney, Agent, or Firm—R. L. Phillips

[57] ABSTRACT

An air-deflecting arrangement in a motor vehicle for maintaining a predetermined portion of a side window in a door of said motor vehicle substantially clear and unobscured from airborne road dust, said motor vehicle door having a bodywork portion located adjacent a forward edge of said side window and a rear-view mirror mounted on said door so as to be readily visible to an occupant of the vehicle through said predetermined portion of said side window, said air-deflecting arrangement comprising an air-deflecting edge member extending substantially vertically along said bodywork portion and adjacent said forward edge of said side window, said air-deflecting edge member being formed with a smoothly curved lip portion extending away from said side window such that, when the vehicle is in forward motion, the air stream passing said side window is deflected away from said predetermined portion and thus substantially prevented from depositing thereon any road dust and water entrained in said air stream.

7 Claims, 2 Drawing Figures

U.S. Patent

Apr. 29, 1980

4,200,327

AIR-DEFLECTING ARRANGEMENT

The invention relates to an arrangement whereby the side window pane of a motor vehicle is kept clean, to ensure unobscured visibility of an outside rear-view mirror whose mirror housing is arranged on a mirror base at a distance from the bodywork side panel or from the side window pane.

An air-deflecting arrangement in a motor vehicle according to the invention, is provided for maintaining a predetermined portion of a side window of said motor vehicle substantially clear and unobscured from airborne road dust, said motor vehicle having a bodywork portion located adjacent a forward edge of said side window and a rear-view mirror mounted on said vehicle so as to be readily visible to an occupant of the vehicle through said predetermined portion of said side window, comprises an air-deflecting edge member extending substantially vertically along said bodywork portion and adjacent said forward edge of said side window, said air-deflecting edge member being formed with a smoothly curved lip portion extending away from said side window such that, when the vehicle is in forward motion, the air stream passing said side window is deflected away from said predetermined portion and thus prevented from depositing thereon any road dust and water entrained in said air stream.

In an arrangement of the above-mentioned kind, an air-deflecting edge member on the vehicle bodywork extending substantially in a vertical direction and deflecting the air-flow from the side window pane, is provided in front of the desired unobscured area of this window pane.

Advantageously, the air-deflecting edge member is formed by an oblique surface which extends at an angle of about 30° with respect to the side pane, and terminates in a smoothly curved lip portion extending parallel with the side window pane of the vehicle.

Of course, this angle and also the length of the oblique surface may vary depending on certain factors, e.g., what distance the air-deflecting edge is to be arranged in front of the desired unobscured area of the window pane and over what length of the window pane this area is to extend. Due to the presence of this air-deflecting edge member on the vehicle, an air stream passing the vehicle and pervaded with dust particles or mixed with particles of dirty water is deflected away from the side window pane so that fouling of the window pane over a certain predetermined area is prevented. Of course, at some distance behind the air-deflecting edge member, the air stream approaches the side window pane again and soiling of the latter takes place to a certain extent once more, but said soiling no longer interferes with the clear view of an outside rear-view mirror arranged on the same side of the vehicle as the side window pane.

Appropriately, the lip portion of the oblique surface is rounded off towards the side window pane. This diminishes vortex formation in the passing air stream at this point.

Naturally, the air-deflecting edge member may extend over any length or to any desired level on the side window. This level must be such that the unobscured area maintained clear from soiling will also be of sufficient height so that this area provides adequate visibility therethrough equally as well for both tall or short drivers in any seated position. Appropriately therefore, the air-deflecting edge member will extend from an upper point on the forward edge of the side window frame to a point adjacent the lowest portion of the window pane. In the usual situation, the side window concerned is located in a door of the vehicle, and can be raised or lowered relative to the vehicle door in order to close or open the window. In this situation, the air-deflecting edge extends down to the bodywork of the door adjacent the slotted opening into which the side window can be lowered.

If desired, the air-deflecting edge may be formed on the window guide portion of the window frame of the vehicle door. Then, a particularly advantageous arrangement is created if, for the purpose of mounting an external rear-view mirror on the door and to the window frame, a triangular plate forming a mirror support plate is inserted or formed thereon and the air-deflecting edge member is arranged on this mirror support plate at the rearward side thereof and thus extends at an appropriate distance behind the mirror.

The mirror support plate is generally covered by a covering part which consists of a synthetic plastics material. Appropriately, the air-deflecting edge member is fashioned on this covering part. Depending on the manner of attachment and position of the rear-view mirror relative to the side window, this air-deflecting edge member may of course be formed at any part of the vehicle which is in the correct location relative to the side window. It might also be conceivable with a door-mounted mirror to associate the air-deflecting edge member with the mirror base or to fashion it thereon in such a way that, once the mirror is attached to the door, the air-deflecting edge member is positioned correctly relative to the side window pane.

Figure 2:
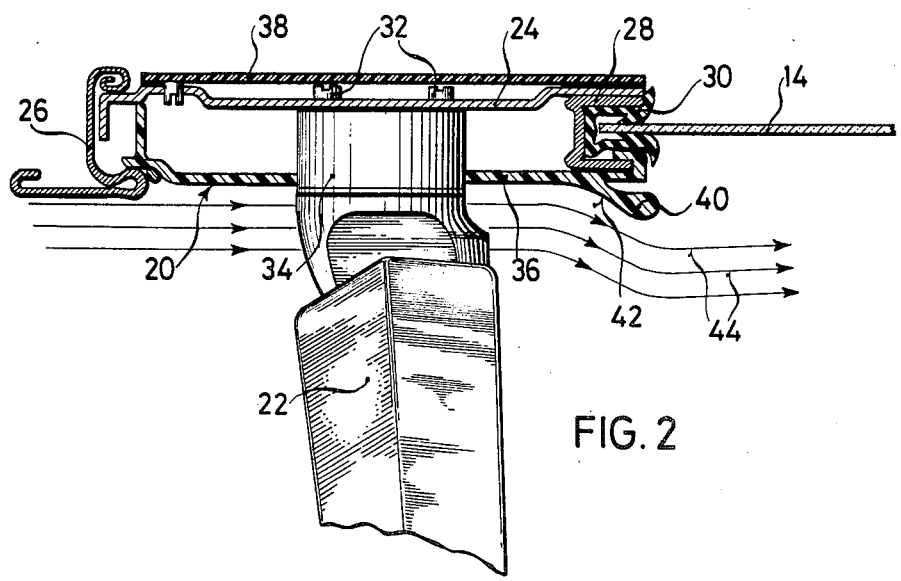

An embodiment of the invention by way of example will now be explained in further detail with reference to the accompanying drawings in which:

FIG. 1 is a perspective view of a part of a motor vehicle showing one embodiment of the invention; and FIG. 2 is a section along line II—II in FIG. 1, drawn to a larger scale.

Reference numeral 2 designates a forward roof pillar of a motor vehicle which is bounded on one side by a windscreen 4 and on the other side by a vehicle door 6. Reference numeral 8 designates a front wing and 10 an engine compartment bonnet of the vehicle. The vehicle door 6 is provided with a window guide-rail 12 guiding a side window pane 14 which can be lowered into a window slot 16 of a door side panel 18 in order to open the side window.

The front corner between the window guide-rail 12 and the door member 18 is a triangular plate 20 which forms a mirror support plate for securing an outside rear-view mirror 22 to the vehicle door 6. This mirror support plate 20 consists, as shown in FIG. 2, of a section 24 of inside door sheeting to which there is attached, on the one hand, a flange 26, and, on the other hand, a vertical section 28 of the window guide-rail. In the window guide rail, the side window pane 14 passes between opposed lips of a window seal 30.

A mirror base 34 of the outside rear-view mirror 22 is secured to the inside door sheet 24 of the mirror support plate 20 by means of screws 32. At the same time, the mirror base 34 passes through a corresponding cavity in a synthetic plastics covering part 36 forming an outer trim cover of the mirror support plate 20. An inner cover consisting of synthetic plastics material is designated by 38.

The synthetic plastics covering part 36 is provided with an air-deflecting edge member 40 which runs approximately in a vertical direction relative to the door and—when viewed from the left hand side of FIG. 1 of the drawings—is located behind the mirror base 34 and the mirror 22. The air-deflecting edge member 40, which is provided with an oblique surface 42 running at an angle of about 30° with respect to the side window pane 14, ensures that the air flow past the vehicle is deflected away from this window pane 14, as indicated by the arrows 44. The result is that a region of the side pane 14 is kept substantially free from soiling, as illustrated for example, by the area 46 framed in dash-dot lines in FIG. 1. Therefore, even if dirty water flows off laterally from the windscreen 4 or is whirled up from the road, a clear view towards the outside rear-view mirror is ensured to a substantially high degree. The free end of the air-deflecting edge member 40 is rounded off towards the side window pane 14, to decrease the possibility of any vortices forming in the passing air stream at the free end of this air-deflecting edge member 40.

We claim:

1. An air-deflecting arrangement in a motor vehicle for maintaining a predetermined portion of a side window of said motor vehicle substantially clear and unobscured from airborne road dust, said motor vehicle having a bodywork portion located adjacent a forward edge of said side window and a rear-view mirror mounted on said vehicle so as to be readily visible to an occupant of the vehicle through said predetermined portion of said side window, said air-deflecting arrangement comprising an air-deflecting edge member extending substantially vertically along said bodywork portion and adjacent said forward edge of said window without forming any air space between said bodywork portion and said air-deflecting edge member, said air-deflecting edge member being formed with a smoothly curved lip portion extending away from said side window such that, when the vehicle is in forward motion, the air stream passing said side window is deflected away from said predetermined portion and thus substantially prevented from depositing thereon any road dust and water entrained in said air stream.

2. An air-deflecting arrangement in a motor vehicle for maintaining a predetermined portion of a side window of said motor vehicle substantially clear and unobscured from airborne road dust, said motor vehicle having a bodywork portion located adjacent a forward edge of said side window and a rear-view mirror mounted on said vehicle so as to be readily visible to an occupant of the vehicle through said predetermined portion of said side window, said air-deflecting arrangement comprising an air-deflecting edge member extending substantially vertically along said bodywork portion and adjacent said forward edge of said side window without forming any air space between said bodywork portion and said air-deflecting edge member, said air-deflecting edge member being formed with a smoothly curved lip portion extending away from said side window, and a surface portion that extends from adjacent said bodywork portion to said lip portion at an angle of substantially 30° to said side window, such that, when the vehicle is in forward motion, the air stream passing said side window is deflected away from said predetermined portion and thus substantially prevented from depositing thereon any road dust and water entrained in said air stream.

3. An air-deflecting arrangement in a motor vehicle for maintaining a predetermined portion of a side window of said motor vehicle substantially clear and unobscured from airborne road dust, said motor vehicle having a bodywork portion located adjacent a forward edge of said side window and a rear-view mirror mounted on said vehicle so as to be readily visible to an occupant of the vehicle through said predetermined portion of said side window, said air-deflecting arrangement comprising an air-deflecting edge member extending substantially vertically along said bodywork portion and adjacent said forward edge of said side window without forming any air space between said bodywork portion and said air-deflecting edge member, said air-deflecting edge member being formed with a smoothly curved lip portion extending away from said side window, and a surface portion that extends from adjacent said bodywork portion to said lip portion at an angle of substantially 30° to said side window, the lip portion of said air-deflecting edge member extending substantially parallel to the side window pane, and being formed with a curved surface facing said side window pane, such that, when the vehicle is in forward motion, the air stream passing said side window is deflected away from said predetermined portion and thus substantially prevented from depositing thereon any road dust and water entrained in said air stream.

4. An air-deflecting arrangement in a motor vehicle for maintaining a predetermined portion of a side window of said motor vehicle substantially clear and unobscured from airborne road dust, said motor vehicle having a bodywork portion located adjacent a forward edge of said side window and a rear-view mirror mounted on said vehicle so as to be readily visible to an occupant of the vehicle through said predetermined portion of said side window, said air-deflecting arrangement comprising an air-deflecting edge member extending substantially vertically along said bodywork portion and adjacent said forward edge of said side window without forming any air space between said bodywork portion and said air-deflecting edge member, said air-deflecting edge member being formed with a smoothly curved lip portion extending away from said side window such that, when the vehicle is in forward motion, the air stream passing said side window is deflected away from said predetermined portion and thus substantially prevented from depositing thereon any road dust and water entrained in said air stream, the air-deflecting edge member being located on said vehicle in a rearward position relative to said rear-view mirror so that, when the vehicle is in said forward motion, the air stream passing the vehicle flows past the rear-view mirror before flowing past said air-deflecting edge member.

5. An air deflecting arrangement according to claim 4, in which the lip portion of said air-deflecting edge member extends substantially parallel to the side window pane, and is formed with a curved surface facing said side window pane.

6. An air-deflecting arrangement in a motor vehicle for maintaining a predetermined portion of a side window of said motor vehicle substantially clear and unobscured from airborne road dust, said motor vehicle having a bodywork portion located adjacent a forward edge of said side window and a rear-view mirror mounted on said vehicle so as to be readily visible to an occupant of the vehicle through said predetermined portion of said side window, the side window of the vehicle is an openable window in a door of the vehicle, said window being movable between a raised, closed position in which it is housed in a window frame and a lowered, opened position in which it is housed in a slotted aperture in the bodywork of the door, said air-deflecting arrangement comprising an air-deflecting edge member extending substantially vertically along said bodywork portion from an upper point on a forward edge of said window frame to a point on the bodywork of the door adjacent said slotted aperture without forming any air space between said bodywork portion and said air-deflecting edge member, said air-deflecting edge member being formed with a smoothly curved lip portion extending away from said side window such that, wnen the vehicle is in forward motion, the air stream passing said side window is deflected away from said predetermined portion and thus substantially prevented from depositing thereon any road dust and water entrained in said air stream.

7. An air-deflecting arrangement in a motor vehicle for maintaining a predetermined portion of a side window in a door of said motor vehicle substantially clear and unobscured from airborne road dust, said door having a bodywork portion located adjacent a forward edge of said side window in the form of a triangular plate mounted on one edge to the bodywork of the door and on another edge to a forward edge of a window frame for said side window, which triangular plate is covered by an outer trim cover formed from a synthetic plastics material, and a rear-view mirror mounted on said triangular plate so as to be readily visible to an occupant of the vehicle through said predetermined portion of said side window, said air-deflecting arrangement comprising an air-deflecting edge member which forms an integral part of said outer trim cover, extending substantially vertically along said bodywork portion adjacent said forward edge of said side window and in a rearward position relative to said rear-view mirror without forming any air space between said bodywork portion and said air-deflecting edge member, said air-deflecting edge member being formed with a smoothly curved lip portion extending away from said side window, and a surface portion that extends from adjacent said bodywork portion to said lip portion at an angle of substantially 30° to said side window, such that, when the vehicle is in forward motion, the air stream passing said side window is deflected away from said predetermined portion and thus substantially prevented from depositing thereon any road dust and water entrained in said air stream.

* * * * *